(12) United States Patent
Wagner et al.

(10) Patent No.: US 12,491,646 B2
(45) Date of Patent: *Dec. 9, 2025

(54) SYSTEMS AND METHODS FOR PROVIDING DYNAMIC COMMUNICATIVE LIGHTING IN A ROBOTIC ENVIRONMENT

(71) Applicant: Berkshire Grey Operating Company, Inc., Bedford, MA (US)

(72) Inventors: Thomas Wagner, Concord, MA (US); Kevin Ahearn, Nebo, NC (US); Michael Dawson-Haggerty, Pittsburgh, PA (US); Christopher Geyer, Arlington, MA (US); Thomas Koletschka, Somerville, MA (US); Kyle Maroney, Saunderstown, RI (US); Matthew T. Mason, Atlanta, GA (US); Gene Temple Price, Somerville, MA (US); Joseph Romano, Arlington, MA (US); Daniel Smith, Wexford, PA (US); Siddhartha Srinivasa, Seattle, WA (US); Prasanna Velagapudi, Pittsburgh, PA (US); Thomas Allen, Reading, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 92 days.

This patent is subject to a terminal disclaimer.

(21) Appl. No.: 18/376,890

(22) Filed: Oct. 5, 2023

(65) Prior Publication Data

US 2024/0033951 A1    Feb. 1, 2024

Related U.S. Application Data

(63) Continuation of application No. 17/395,929, filed on Aug. 6, 2021, now Pat. No. 11,813,741, which is a
(Continued)

(51) Int. Cl.
  B25J 19/06    (2006.01)
  B25J 9/16     (2006.01)
  G08B 5/36     (2006.01)

(52) U.S. Cl.
  CPC ............. *B25J 19/06* (2013.01); *B25J 9/1676* (2013.01); *G08B 5/36* (2013.01); *G05B 2219/40202* (2013.01)

(58) Field of Classification Search
  CPC ........ A47L 9/2857; B07C 3/00; B25J 9/0084; B25J 9/163; B25J 9/1697; B25J 9/1676;
  (Continued)

(56) References Cited

U.S. PATENT DOCUMENTS

| 4,412,775 A | 11/1983 | Molitor et al. |
| 4,557,659 A | 12/1985 | Scaglia |

(Continued)

FOREIGN PATENT DOCUMENTS

| CA | 2998403 C | 4/2021 |
| CH | 701886 A2 | 3/2011 |

(Continued)

OTHER PUBLICATIONS

Decision on Rejection issued by the China National Intellectual Property Administration in related Chinese Patent Application No. 202210026563.2 on Apr. 29, 2024, 21 pages.

(Continued)

*Primary Examiner* — Stephen R Burgdorf
(74) *Attorney, Agent, or Firm* — Gesmer Updegrove LLP

(57) ABSTRACT

A robotic system is disclosed that includes an articulated arm with an end effector. The robotic system is for use in a robotic environment requiring interaction with persons in the robotic environment, and includes a plurality of lights that are illuminated responsive to known near-future movements of the articulated arm to convey the known near- (Continued)

future movements of the articulated arm to the persons in the robot environment.

29 Claims, 4 Drawing Sheets

Related U.S. Application Data continuation of application No. 16/826,819, filed on Mar. 23, 2020, now Pat. No. 11,117,271, which is a continuation of application No. 16/243,753, filed on Jan. 9, 2019, now Pat. No. 10,632,631, which is a continuation of application No. 15/259,961, filed on Sep. 8, 2016, now Pat. No. 10,265,872.

(60) Provisional application No. 62/216,017, filed on Sep. 9, 2015.

(58) Field of Classification Search
CPC ......... B25J 13/089; B25J 19/06; B65G 1/137; G02B 27/281; G05B 2219/40196; G05B 2219/40202; G07F 9/02; G08B 5/36; H05B 37/0227; H05B 47/155
USPC ........................................................ 340/679
See application file for complete search history.

(56) References Cited

U.S. PATENT DOCUMENTS

| | | | |
|---|---|---|---|
| 4,704,694 A | | 11/1987 | Czerniejewski |
| 4,846,335 A | | 7/1989 | Hartlepp |
| 4,896,357 A | | 1/1990 | Hatano et al. |
| 5,328,169 A | * | 7/1994 | Mandel ................. B65H 39/11 271/298 |
| 5,794,789 A | | 8/1998 | Payson et al. |
| 5,865,487 A | | 2/1999 | Gore et al. |
| 5,881,890 A | | 3/1999 | Wiley |
| 6,079,570 A | | 6/2000 | Oppliger et al. |
| 6,520,342 B1 | * | 2/2003 | Dumke ..................... B07C 3/00 209/583 |
| 6,865,487 B2 | | 3/2005 | Charron |
| 7,313,464 B1 | | 12/2007 | Perreault et al. |
| 7,474,939 B2 | | 1/2009 | Oda et al. |
| 7,516,848 B1 | | 4/2009 | Shakes et al. |
| 7,677,622 B2 | | 3/2010 | Dunkmann et al. |
| 7,861,844 B2 | | 1/2011 | Hayduchok et al. |
| 8,718,814 B1 | | 5/2014 | Clark et al. |
| 8,874,270 B2 | | 10/2014 | Ando |
| 8,952,284 B1 | | 2/2015 | Wong et al. |
| 9,061,868 B1 | | 6/2015 | Paulsen et al. |
| 9,120,622 B1 | | 9/2015 | Elazary et al. |
| 9,227,323 B1 | | 1/2016 | Konolige et al. |
| 9,259,844 B2 | | 2/2016 | Xu et al. |
| 9,492,923 B2 | | 11/2016 | Wellman et al. |
| 9,604,363 B2 | | 3/2017 | Ban |
| 10,265,872 B2 | | 4/2019 | Wagner et al. |
| 10,632,631 B2 | | 4/2020 | Wagner et al. |
| 11,117,271 B2 | | 9/2021 | Wagner et al. |
| 2001/0045755 A1 | | 11/2001 | Schick et al. |
| 2001/0056316 A1 | | 12/2001 | Johnson et al. |
| 2002/0027652 A1 | | 3/2002 | Paromtchik et al. |
| 2003/0135300 A1 | | 7/2003 | Lewis |
| 2006/0177295 A1 | | 8/2006 | Frueh et al. |
| 2006/0242785 A1 | | 11/2006 | Cawley et al. |
| 2007/0005179 A1 | | 1/2007 | Mccrackin et al. |
| 2008/0179224 A1 | | 7/2008 | Van Bossuyt |
| 2008/0181485 A1 | | 7/2008 | Beis et al. |
| 2009/0019818 A1 | | 1/2009 | Gilmore et al. |
| 2010/0125361 A1 | | 5/2010 | Mougin et al. |
| 2010/0180711 A1 | | 7/2010 | Kilibarda et al. |
| 2010/0234857 A1 | | 9/2010 | Itkowitz et al. |
| 2011/0054689 A1 | | 3/2011 | Nielsen et al. |
| 2011/0144798 A1 | | 6/2011 | Freudelsperger |
| 2011/0160910 A1 | | 6/2011 | Preisinger et al. |
| 2011/0176148 A1 | | 7/2011 | Briggs et al. |
| 2011/0184555 A1 | | 7/2011 | Kosuge et al. |
| 2011/0320036 A1 | | 12/2011 | Freudelsperger |
| 2012/0215346 A1 | | 8/2012 | Gingher et al. |
| 2013/0232918 A1 | | 9/2013 | Lomerson, Jr. |
| 2013/0245824 A1 | | 9/2013 | Barajas et al. |
| 2013/0343640 A1 | | 12/2013 | Buehler et al. |
| 2014/0005831 A1 | | 1/2014 | Naderer et al. |
| 2014/0067121 A1 | | 3/2014 | Brooks et al. |
| 2014/0067127 A1 | | 3/2014 | Gotou |
| 2014/0195979 A1 | | 7/2014 | Branton et al. |
| 2014/0291112 A1 | | 10/2014 | Lyon et al. |
| 2014/0305847 A1 | | 10/2014 | Kudrus |
| 2014/0316570 A1 | | 10/2014 | Sun et al. |
| 2015/0057793 A1 | | 2/2015 | Kawano |
| 2015/0073589 A1 | | 3/2015 | Khodl et al. |
| 2015/0081090 A1 | | 3/2015 | Dong |
| 2015/0217937 A1 | | 8/2015 | Marquez |
| 2015/0224650 A1 | | 8/2015 | Xu et al. |
| 2015/0369618 A1 | | 12/2015 | Barnard et al. |
| 2015/0375401 A1 | | 12/2015 | Dunkmann et al. |
| 2016/0027093 A1 | | 1/2016 | Crebier |
| 2016/0136816 A1 | | 5/2016 | Pistorino |
| 2016/0199884 A1 | | 7/2016 | Lykkegaard et al. |
| 2016/0243704 A1 | | 8/2016 | Vakanski et al. |
| 2016/0244262 A1 | | 8/2016 | O'Brien et al. |
| 2017/0043953 A1 | | 2/2017 | Battles et al. |
| 2017/0050315 A1 | | 2/2017 | Henry et al. |
| 2017/0066597 A1 | | 3/2017 | Hiroi |
| 2017/0080566 A1 | | 3/2017 | Stubbs et al. |
| 2017/0087731 A1 | | 3/2017 | Wagner et al. |
| 2017/0106532 A1 | | 4/2017 | Wellman et al. |
| 2017/0276472 A1 | | 9/2017 | Becker et al. |
| 2019/0143543 A1 | | 5/2019 | Wagner et al. |
| 2020/0223075 A1 | | 7/2020 | Wagner et al. |
| 2021/0362356 A1 | | 11/2021 | Wagner et al. |
| 2022/0144545 A1 | | 5/2022 | Harder |

FOREIGN PATENT DOCUMENTS

| | | |
|---|---|---|
| CN | 104870147 A | 8/2015 |
| CN | 108349096 A | 7/2018 |
| CN | 114248272 A | 3/2022 |
| DE | 102007038834 A1 | 2/2009 |
| DE | 102013020137 A1 | 6/2015 |
| EP | 0613841 A1 | 9/1994 |
| EP | 1256421 A1 | 1/2008 |
| EP | 1995192 A2 | 11/2008 |
| EP | 2960024 A2 | 12/2015 |
| EP | 3006379 A2 | 4/2016 |
| EP | 3347175 B1 | 3/2022 |
| EP | 3988263 B1 | 1/2024 |
| JP | H09244730 A | 9/1997 |
| WO | 2010034044 A2 | 4/2010 |
| WO | 2010099873 A1 | 9/2010 |
| WO | 2014111483 A1 | 7/2014 |
| WO | 2015162390 A1 | 10/2015 |
| WO | 2017044630 A1 | 3/2017 |

OTHER PUBLICATIONS

Cipolla et al., "Visually Guided Grasping in Unstructured Environments," J. of Robotics and Autonomous Sys., pp. 1-20.
Communication pursuant to Rules 161(1) and 162EPC issued by the European Patent Office on Apr. 17, 2018 in related European Patent Application No. 16767467.0, 3 pages.
Examiner's Report issued by the Canadian Intellectual Property Office on May 16, 2019 in related Canadian Patent Application No. 2,998,403, 3 pages.
Extended European Search Report issued by the European Patent Office in related European Patent Application No. 21214194.9 on Mar. 4, 2022, 5 pages.
Final Office Action issued by the U.S. Patent and Trademark Office on Feb. 13, 2018 in related U.S. Appl. No. 15/259,961, 33 pages.
First Office Action, and its English translation, issued by the China National Intellectual Property Administration in related Chinese Patent Application No. 201680062748.1 on Jul. 22, 2020, 20 pages.

(56) References Cited

OTHER PUBLICATIONS

Herbert et al., "A Robotic Gripper System for Limp Material Manipulation: Hardware and Software Development and Integration," Proc. of the 1997 IEEE, Int'l Conf. on Robotics and Automation, Apr. 1997, pp. 15-21.
International Preliminary Report on Patentability issued by the International Bureau of WIPO on Mar. 13, 2018 for International Application No. PCT/US2016/050786, 7 pages.
International Search Report and Written Opinion issued by the International Searching Authority on Nov. 24, 2016 for International Application No. PCT/US2016/050786, 9 pages.
Klingbeil et al., "Grasping with Application to an Autonomous Checkout Robot," Proc. of IEEE, Int'l Conf. on Robotics and Automation, Jun. 2011, 9 pages.
Liu et al., "Hand Arm Coordination for a Tomato Harvesting Robot Based on Commercial Manipulator," Proc. of the IEEE, Int'l Conf. on Robotics and Biometrics, Dec. 2013, pp. 2715-2720.
Non-Final Office Action issued by the U.S. Patent and Trademark Office on Jul. 10, 2017 in related U.S. Appl. No. 15/259,961, 31 pages.
Non-Final Office Action issued by the U.S. Patent and Trademark Office on Aug. 21, 2018 in related U.S. Appl. No. 15/259,961, 31 pages.
Non-Final Office Action issued by the U.S. Patent and Trademark Office on Dec. 20, 2019 in related U.S. Appl. No. 16/243,753, 35 pages.
Non-Final Office Action issued by the U.S. Patent and Trademark Office in related U.S. Appl. No. 16/826,819 on May 5, 2021, 16 pages.
Non-Final Office Action issued by the United States Patent and Trademark Office in related U.S. Appl. No. 17/395,929 on Apr. 7, 2023, 37 pages.
Notice on the First Office Action, along with its English translation, issued by the China National Intellectual Property Administration in related Chinese Patent Application No. 202210026563.2 on Mar. 31, 2023, 25 pages.
Notice on the Second Office Action, along with its English translation, issued by the China National Intellectual Property Administration in related Chinese Patent Application No. 202210026563.2 on Dec. 19, 2023, 21 pages.
Notice on the Third Office Action and the Third Office Action, along with its English translation, issued by the China National Intellectual Property Administration in related Chinese Patent Application No. 201680062748.1 on Jun. 30, 2021, 23 pages.
Second Office Action, and its English translation, issued by the China National Intellectual Property Administration in related Chinese Patent Application No. 201680062748.1 on Feb. 20, 2021, 18 pages.
Vitton et al., "A Flexible Robotic Gripper for Automation of Assembly Tasks," Proc. of the ASME—Dynamic Systems & Control Div., 2003, vol. 2, 7 pages.

* cited by examiner

SYSTEMS AND METHODS FOR PROVIDING DYNAMIC COMMUNICATIVE LIGHTING IN A ROBOTIC ENVIRONMENT

PRIORITY

The present application is a continuation of U.S. patent application Ser. No. 17/395,929, filed Aug. 6, 2021; which is a continuation of U.S. patent application Ser. No. 16/826,819, filed Mar. 23, 2020, now U.S. Pat. No. 11,117,271, issued Sep. 14, 2021; which is a continuation of U.S. patent application Ser. No. 16/243,753, filed Jan. 9, 2019, now U.S. Pat. No. 10,632,631, issued Apr. 28, 2020; which is a continuation of U.S. patent application Ser. No. 15/259,961, filed Sep. 8, 2016, now U.S. Pat. No. 10,265,872, issued Apr. 23, 2019, which claims priority to U.S. Provisional Patent Application Ser. No. 62/216,017, filed Sep. 9, 2015, the entire disclosures of which are hereby incorporated by reference in their entireties.

BACKGROUND

The invention generally relates to robotic systems, and relates in particular, to robotic systems that are used in an environment involving human activity.

Certain robotic systems are intended to be used in environments that also include people. In warehouse sortation environments for example, human workers are responsible for taking objects and placing them onto shelves in correct locations. A common paradigm is to use workcells with put-to-light systems to facilitate this process by indicating via lights the desired target location. These systems typically employ either monochromatic lights or have a display showing the number of items that the worker should place on the shelf. By using these lights as visual cues, valuable time is shaved off of the sortation task. Additionally, workers may have issues sorting particular unexpected, damaged, non-bar-coded or otherwise problematic unsortable items. When workers come across objects such as these, they may raise a small flag or activatable light to indicate to a manager or foreman that they had issues processing an item. This allows them to continue sorting without leaving their work area.

Current solutions such as put-to-light however, do not translate well for use in automated systems. Using lighting to demonstrate to a robot where to place an object may in fact, be fundamentally worse than sending placement locations directly from a Warehouse Management System or other database. As such, automated systems do not typically use lighting in determining object placement. Further, human workers who work in sortation facilities may have preconceived expectations of the role lighting plays in sortation. There remains a need therefore, for a robotic system that is able to better, quickly and efficiently communicate with human workers in the robotic environment, information that may help to keep each human worker safe from injury.

SUMMARY

In accordance with an embodiment, the invention provides a robotic system including an articulated arm with an end effector. The robotic system is for use in a robotic environment requiring interaction with persons in the robotic environment, and the robotic system includes a plurality of lights that are illuminated responsive to known near-future movements of the articulated arm to convey the known near-future movements of the articulated arm to the persons in the robot environment.

In accordance with another embodiment, the invention provides a robotic system including an articulated arm with an end effector. The robotic system is for use in an environment requiring interaction with persons in the robotic system and includes a plurality of sortation locations and a plurality of lights that are each associated with a sortation location. The system provides that one or more of the plurality of lights is engageable to be illuminated to indicate that the system plans to move the end effector toward a sortation location that is associated with the one or more of the plurality of lights.

In accordance with a further embodiment, the invention provides a method of providing communication lighting in a robotic environment requiring interaction with persons in the robotic environment. The method includes the steps of providing in the robotic environment, a robotic system having an end effector, and providing illumination indicative of a planned direction of movement of the end effector of the robotic system in the robotic environment.

BRIEF DESCRIPTION OF THE DRAWINGS

The following description may be further understood with reference to the accompanying drawings in which.

The drawings are shown for illustrative purposes only.

DETAILED DESCRIPTION

In accordance with an embodiment the invention provides lighting system for use in robotic sortation environment, as well as the use of such a system for conveying system state. In certain embodiments, an array of RGB LEDs is placed on shelves, and an array of RGB LEDs is mounted on an end effector or manipulator. In further embodiments, the invention provides a method of conveying robot state using these systems as well as a light pole.

The invention therefore provides systems and methods for conveying state and near-future information via LED arrays during robotic sortation. In certain embodiments, the invention provides systems and methods for facilitating communication with human workers.

In accordance with various embodiments, the invention provides a robotic system that includes an array of RGB LEDs mounted above or below shelves, and provides in an example, information regarding where the automated system will place future objects, the location of previously placed objects, and general system state. An array of RGB LEDs may be mounted on a manipulator or end effector. The invention also provides for the use of the system in conveying information about the process of picking objects, the qualities of picked objects, the qualities of grasps on objects, and general system state, as well as the use of light poles in conveying automated system state for sortation.

Figure 1:
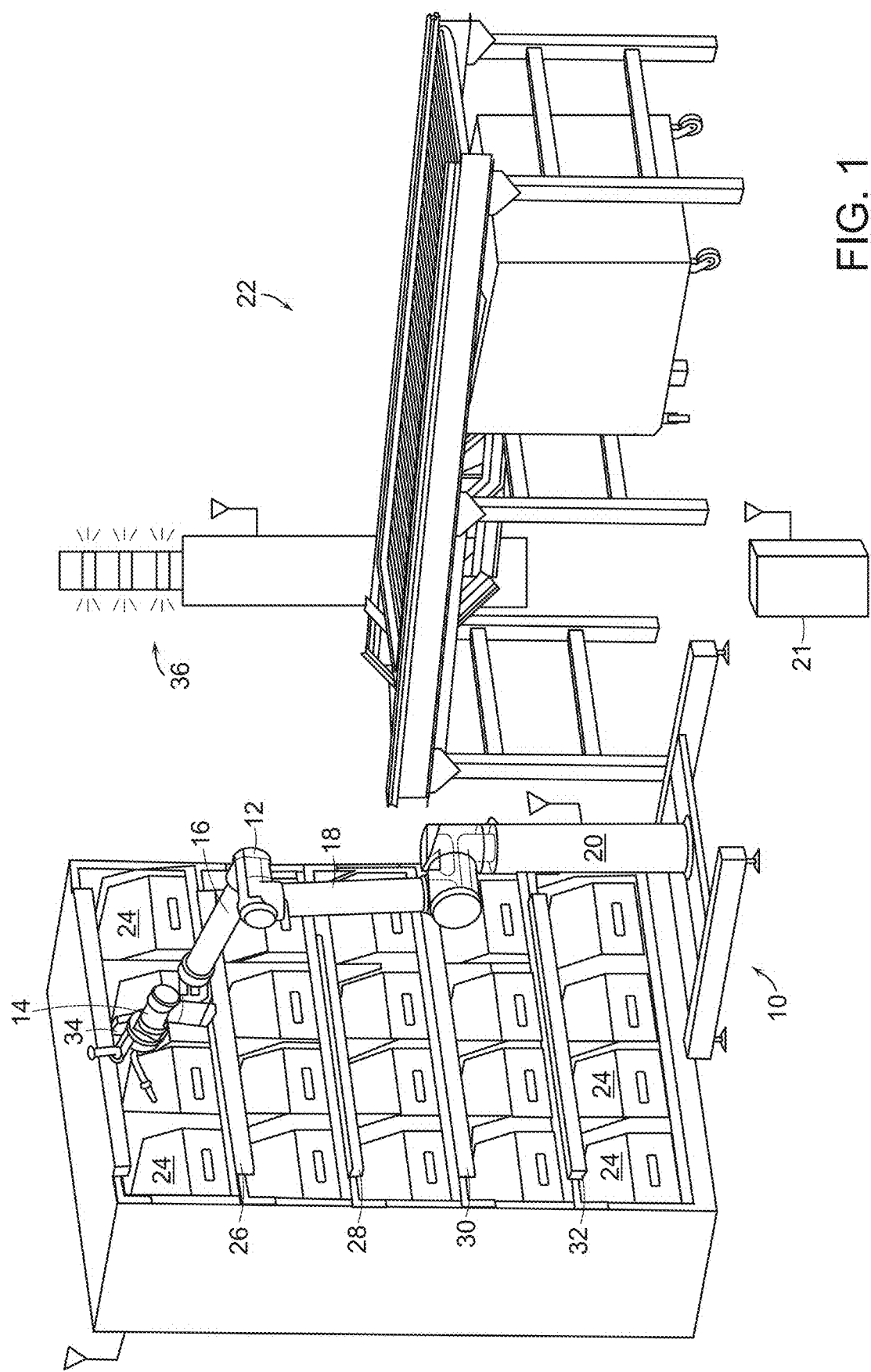
FIG. 1 shows an illustrative diagrammatic view of a robotic system in accordance with an embodiment of the present invention.

FIG. 1, for example, shows a system in accordance with an embodiment of the present invention that includes a robotic system 10 including an articulated arm 12. The articulated arm 12 includes an end effector 14 as well as articulated segments 16, 18 and 20 and is, for example, programmed for picking items from a conveyor 22 and for placing the items in one of several correct bins or sortation locations 24. The robotic system is designed to be employed in an environment that includes human workers that may provide items to the conveyor, remove full bins, provide maintenance of the articulated arms or otherwise perform services that require that they be present in and move around in the robotic environment.

As also shown in FIG. 1, the robotic system may include lighting systems 26, 28, 30 and 32 on shelves that support the bins 24, as well as a lighting system 34 that is located on the end effector 14 for conveying information regarding a state of the end effector, and a lighting system 36 that is indicative of the state of the robot. The robotic system may include a controller in a base of the articulated arm, or may include a remote controller 21 that communicates either wirelessly or by directly wiring to the articulated arm and the robotic environment.

Figure 2:
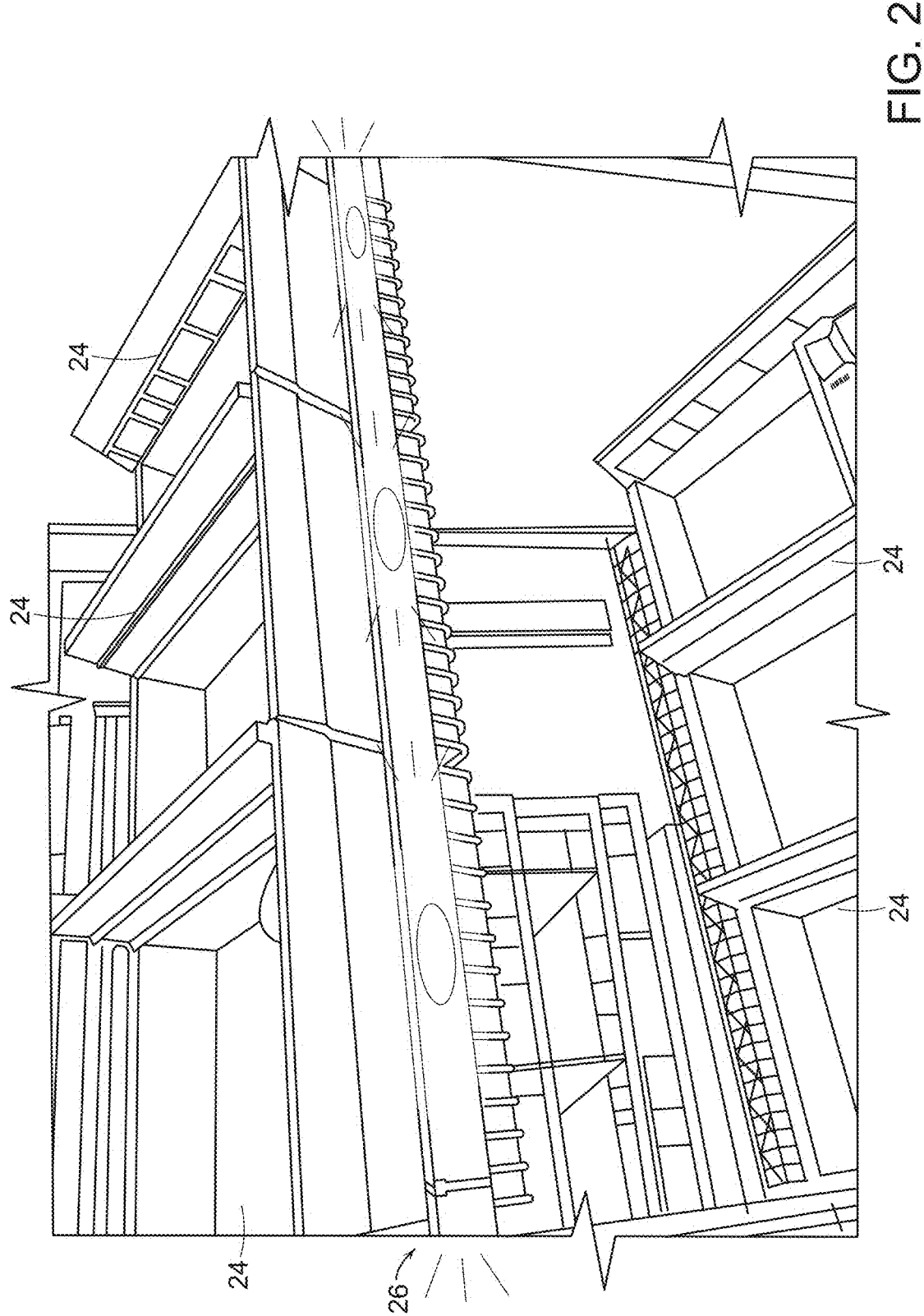
FIG. 2 shows an illustrative diagrammatic view of a destination location portion of the robotic system as shown in FIG. 1.

FIG. 2, for example, shows a lighting system such as any of systems 22, 24, 26 and 28 of FIG. 1 wherein each includes a lighting strip 26 positioned above or below a shelf of bins 24. Each strip of RGB LEDs 26 is mounted on individual shelves and covered with translucent plastic. Controllers are mounted on the side of shelving units. LEDs may be individually controlled through software over a local WiFi network in order to show system state. The lighting strips 26 may be illuminated, for example, in a first color or a first mode (e.g., a first flashing mode) to convey that the system is planning to move the end effector to the associate bin or destination location. Further, the lighting strip may be illuminated in a second color or a second mode (e.g., second flashing mode) to indicate that the associated destination location or bin is full and needs to be removed by a human worker.

In accordance with certain embodiments of the invention therefore, the lighting system may convey the state of the robotic sortation task, as well as the state of the robot. For example, in an embodiment, after the system has selected a place location, a subset of the RGB LEDs 26 adjacent to the place location are illuminated in a pulsing color in order to demonstrate where the robot will place its next object. Once objects are placed, the same LEDs are illuminated in a different color in order to indicate a successful place. Similarly, when performing tasks requiring caution or when an error has occurred, all lights can be placed into a pulsing orange or red color, respectively. Conveying system state in this manner provides human workers with easily accessible and digestible information about the task at hand and allows for advanced collaborative interaction with automated systems.

Figure 3:
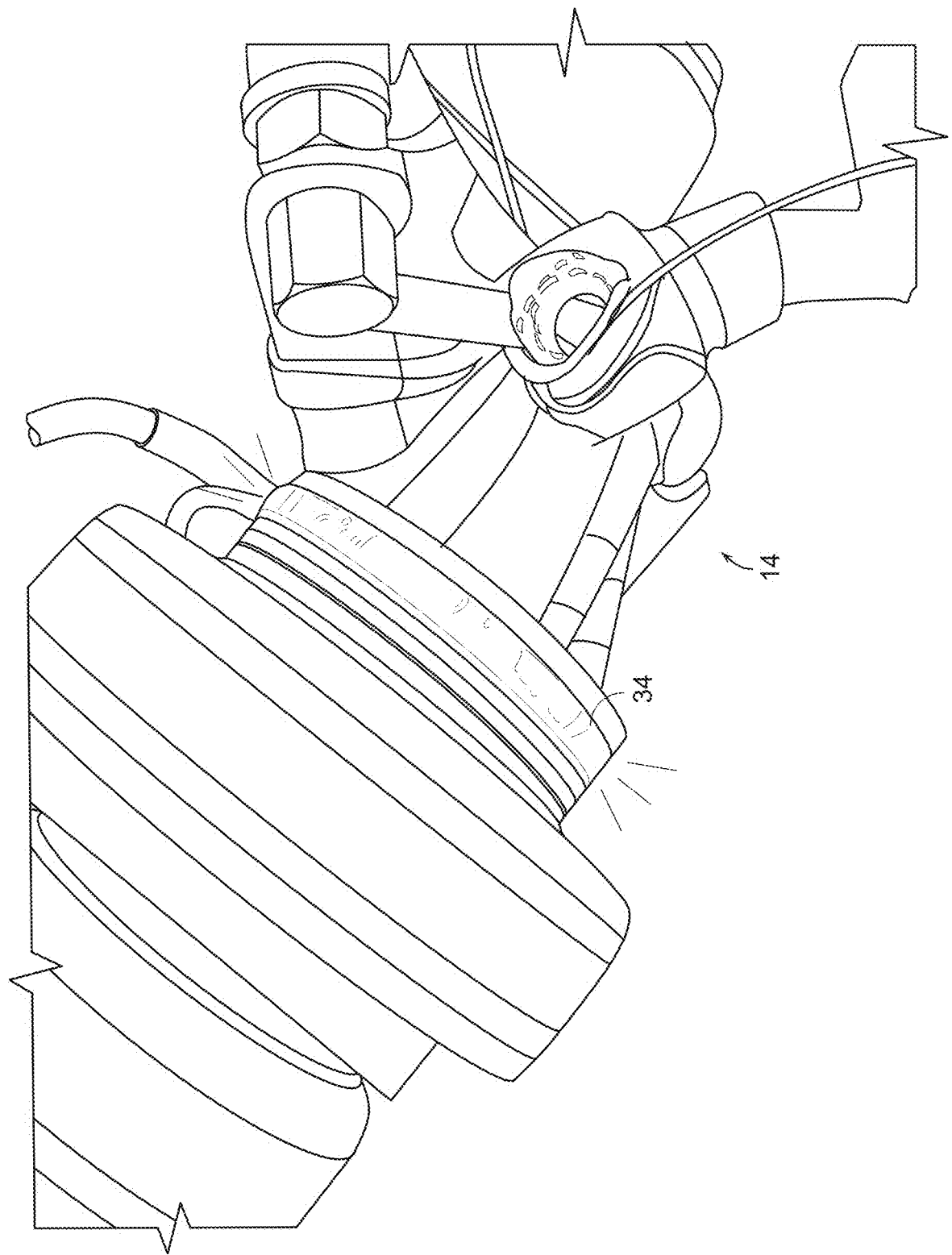
FIG. 3 shows an illustrative diagrammatic view of an end effector portion of the robotic system as shown in FIG. 1.

FIG. 3 shows a lighting system in accordance with an embodiment that includes LEDs 34 that are mounted in a ring on the end effector 14, and are visible through a translucent circular plastic cover. The lights 34 on the end effector 14 are used to convey information about objects about the state of the robot, as well as the state of the system. When objects are picked up, the LEDs 34 are briefly illuminated to indicate a successful grasp, or may show a different color if the item is to be returned to the conveyor 22 due to a compromised grasp, the lights 34 may show a different color and/or flashing illumination. When the robot has entered a different mode, such as movement to a sortation bin, the LEDs 34 are illuminated with different colors. The lights 34 may also be used to show an anticipated direction of movement of the end effector, for example, by having the lights flash green on a side in the direction of which the end effector is about to be moved. Again, the lights 34 may be illuminated with different colors or modes of flashing to communicate robotic state, end effector state, and end effector direction of planned movement.

Figure 4:
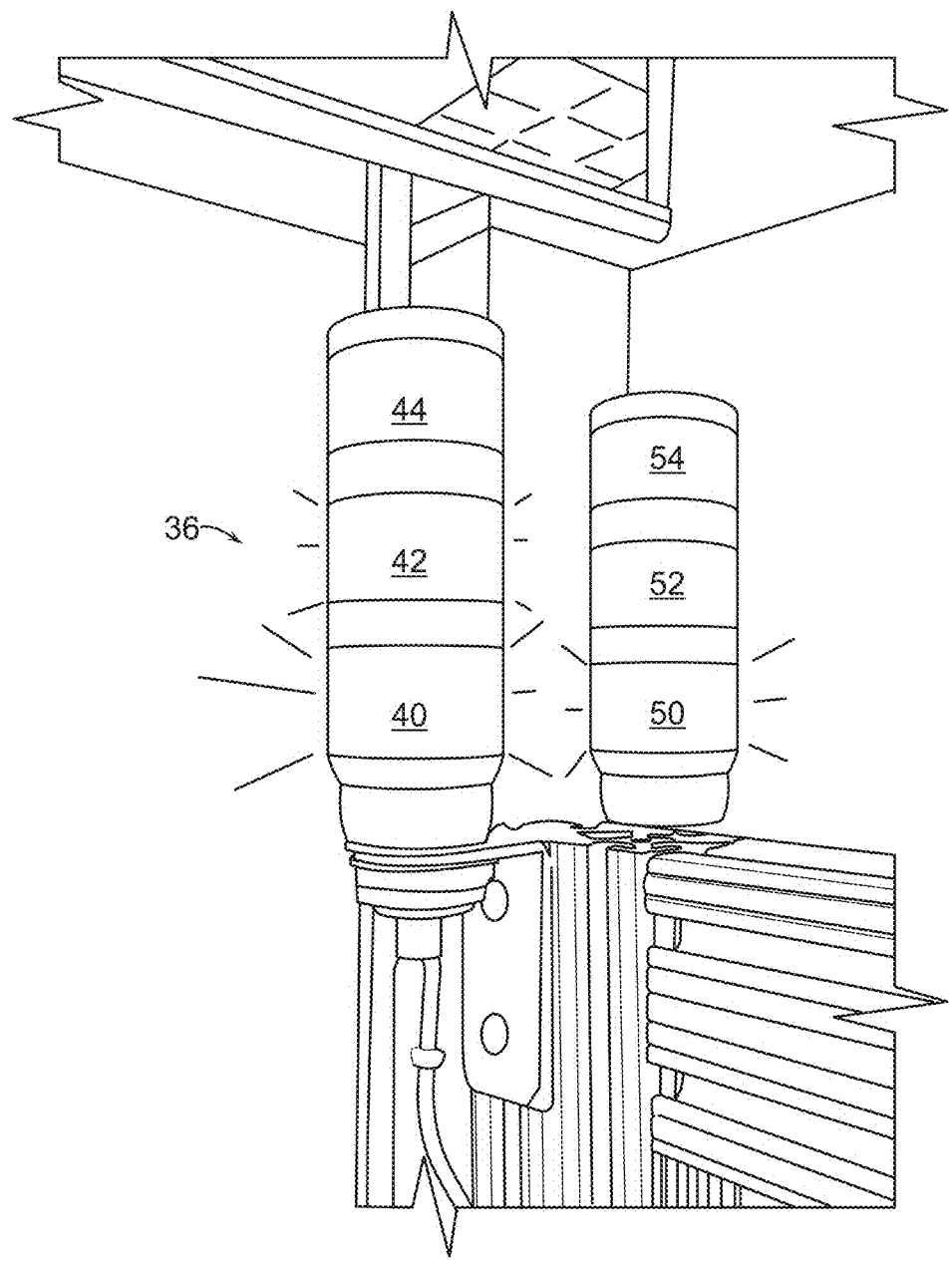
FIG. 4 shows an illustrative diagrammatic view of a plurality of station identification locations of the robotic system of FIG. 1.

FIG. 4 shows an lighting system in accordance with a further embodiment of the invention that includes a lighting system 36, which includes a light pole having individual lights 42 and 44, which are used to indicate system state to human workers who may not be in an immediate area. Typically, this involves illuminating a green light when the system is running and a red light when the system has entered an error state. More complicated states, such as when the system is waiting for additional items to sort, may also be provided. Additional robotic adjacent systems may include other lighting systems including lights 50, 52 and 54. As noted above, the lights 34 may be illuminated with different colors or modes of flashing to communicate robotic state, end effector state, or end effector direction of planned movement.

In accordance with various embodiments, therefore, the plurality of lights may be multi-colored lights proximate to an end effector of the articulated arm. In further embodiments, the plurality of multi-colored lights may be indicative of an intended direction of movement of the end effector, or may be indicative of the end effector grasp quality on an object. In further embodiments, the plurality of multi-colored lights may be provided on a wrist of the end effector, and may be indicative of the robotic system not having proper information regarding a required task for an object, or indicative of the robotic system not recognizing the object. In further embodiments, the plurality of multi-colored lights may be indicative of the robotic system not knowing where to put an object, or may be indicative of where an end effector is being directed. In certain embodiments, the plurality of multi-colored lights include lights at potential target locations that are indicative of when a target location bin is full or otherwise completed.

Those skilled in the art will appreciate that numerous modifications and variations may be made to the above disclosed embodiments without departing from the spirit and scope of the present invention.

What is claimed is:

1. A robotic system comprising:
an articulated arm with an end effector;
a first plurality of lights proximate the end effector; and
a second plurality of lights proximate a plurality of destination bins,
said first plurality of lights being engageable in a grasp quality mode to indicate a grasp quality of the end effector's grasp on an object, and the first plurality of lights being further engageable in a movement destination mode to indicate a planned destination of the end effector by illuminating one or more of the first plurality of lights in association with one or more of the second plurality of lights provided proximate a plurality of destination bins,
each of the second plurality of lights being associated with one of the plurality of destination bins, said second plurality of lights being engageable in a destination bin mode to indicate the association with the one or more of the first plurality of lights, and each of the second plurality of lights being further engageable in a bin complete mode to indicate that a particular destination bin is ready for removal.

2. The robotic system of claim 1, wherein the first plurality of lights is further engageable in a movement direction mode to indicate a planned direction of movement of the end effector by illuminating one or more of the first plurality of lights that are on a side of a ring that is associated with the planned direction of movement of the end effector.

3. The robotic system of claim 1, wherein the first plurality of lights is further engageable in an unknown object mode to indicate that information regarding to where the object is to be moved is not known.

4. The robotic system of claim 1, wherein the first plurality of lights includes multi-colored lights.

5. The robotic system of claim 1, wherein the one or more of the first plurality of lights that are illuminated in association with the one or more of the second plurality of lights are illuminated in a flashing mode.

6. The robotic system of claim 1, wherein the second plurality of lights include multi-colored lights.

7. The robotic system of claim 1, wherein the one or more of the first plurality of lights that are illuminated in association with the one or more of the second plurality of lights are illuminated in a same color.

8. The robotic system of claim 1, wherein the robotic system further includes a third plurality of lights that are engageable in a processing mode to indicate that a processing station that includes the robotic system is engaged in processing a plurality of objects, and the third plurality of lights is further engageable in an alert mode to indicate that an error has occurred at the processing station.

9. The robotic system as claimed in claim 8, wherein the third plurality of lights include multi-colored lights.

10. The robotic system as claimed in claim 8, wherein the third plurality of lights include flashing lights.

11. A robotic system comprising:
an articulated arm with an end effector; and
a first plurality of lights proximate the end effector and a second plurality of lights proximate a plurality of destination bins,
said first plurality of lights including at least a first light that is engageable in a grasp mode to indicate a grasp quality of a grasp of an object by the end effector;
said first plurality of lights and said second plurality of lights each being engageable in an association mode such that at least one of the first plurality of lights and at least one of the second plurality of lights are both engaged in association to indicate that the articulated arm is planning to move the object grasped by the end effector to a selected destination bin of the plurality of destination bins, said at least one of the second plurality of lights being associated with the selected destination bin; and
said second plurality of lights including a plurality of bin status lights, each bin status light being associated with a respective one of the plurality of destination bins, each bin status light being engageable in a status operational mode to indicate that a destination bin among the plurality of destination bins is open to receiving any of a plurality of objects, and each bin status light being further engageable in a status completed mode to indicate that the destination bin is completed and ready to be further processed.

12. The robotic system of claim 11, wherein the first plurality of lights is further engageable in a movement direction mode to indicate a planned direction of movement of the end effector by illuminating one or more of the first plurality of lights that are on a side of a ring that is associated with the planned direction of movement of the end effector.

13. The robotic system of claim 11, wherein the first plurality of lights is further engageable in an unknown object mode to indicate that information regarding to where the object is to be moved is not known.

14. The robotic system of claim 11, wherein the first plurality of lights includes multi-colored lights.

15. The robotic system of claim 11, wherein the at least one of the first plurality of lights that are illuminated in association with the at least one of the second plurality of lights are illuminated in a flashing mode.

16. The robotic system of claim 11, wherein the second plurality of lights include multi-colored lights.

17. The robotic system of claim 11, wherein the at least one of the first plurality of lights that are illuminated in association with the at least one of the second plurality of lights are illuminated in a same color.

18. The robotic system of claim 11, wherein the robotic system further includes a third plurality of lights that are engageable in a processing mode to indicate that a processing station that includes the robotic system is engaged in processing a plurality of objects, and the third plurality of lights is further engageable in an alert mode to indicate that an error has occurred at the processing station.

19. The robotic system as claimed in claim 18, wherein the third plurality of lights include multi-colored lights.

20. The robotic system as claimed in claim 18, wherein the third plurality of lights include flashing lights.

21. A robotic system comprising:
an articulated arm with an end effector;
a first plurality of lights proximate the end effector;
a second plurality of lights proximate a plurality of destination bins; and
a third plurality of lights associated with an object processing station that includes the articulated arm and the plurality of destination bins,
said first plurality of lights including at least a first light that is engageable in a grasp mode to indicate a grasp quality of a grasp of an object by the end effector;
said first plurality of lights and said second plurality of lights each being engageable in an association mode such that at least one of the first plurality of lights and at least one of the second plurality of lights are both engaged in association to indicate that the articulated arm is planning to move the object grasped by the end effector to a selected destination bin of the plurality of destination bins;
said second plurality of lights including a plurality of bin status lights, each bin status light being associated with a respective one of the plurality of destination bins, each bin status light being engageable in a status completed mode to indicate that the destination bin among the plurality of destination bins is completed and ready to be further processed; and
said third plurality of lights being engageable in an alert mode to indicate that an error has occurred at the object processing station.

22. The robotic system of claim 21, wherein the first plurality of lights is further engageable in a movement direction mode to indicate a planned direction of movement of the end effector by illuminating one or more of the first plurality of lights that are on a side of a ring that is associated with the planned direction of movement of the end effector.

23. The robotic system of claim 21, wherein the first plurality of lights is further engageable in an unknown object mode to indicate that information regarding to where the object is to be moved is not known.

24. The robotic system of claim 21, wherein the first plurality of lights includes multi-colored lights.

25. The robotic system of claim 21, wherein the one or more of the first plurality of lights that are illuminated in association with the at least one of the second plurality of lights are illuminated in a flashing mode.

26. The robotic system of claim 21, wherein the second plurality of lights include multi-colored lights.

27. The robotic system of claim 21, wherein the at least one of the first plurality of lights that are illuminated in association with the one or more of the second plurality of lights are illuminated in a same color.

28. The robotic system as claimed in claim 21, wherein the third plurality of lights include multi-colored lights.

29. The robotic system as claimed in claim 21, wherein the third plurality of lights include flashing lights.

\* \* \* \* \*